United States Patent [19]
Brusasco

[11] Patent Number: 4,888,535
[45] Date of Patent: Dec. 19, 1989

[54] VEHICLE POWER SEAT CONTROL SYSTEM
[75] Inventor: Enzo Brusasco, Turin, Italy
[73] Assignee: R.G.B. S.p.A., Italy
[21] Appl. No.: 223,549
[22] Filed: Jul. 22, 1988
[30] Foreign Application Priority Data
 Aug. 7, 1987 [IT] Italy ................... 67698 A/87
[51] Int. Cl.⁴ ............................. G05B 19/42
[52] U.S. Cl. .................. 318/568.1; 307/10.1;
  318/467; 318/280; 318/603; 364/424.05
[58] Field of Search ..................... 307/9, 10 R, 105 B;
  318/283, 284, 344, 466, 568, 603, 286, 103, 562,
  280, 467; 364/424.05

[56] References Cited
U.S. PATENT DOCUMENTS

| | | | |
|---|---|---|---|
| 4,158,160 | 6/1979 | Meiller | 318/467 |
| 4,267,494 | 5/1981 | Matsuoka et al. | 307/10 R X |
| 4,284,935 | 8/1981 | March et al. | 318/280 |
| 4,456,861 | 6/1984 | Ratzel et al. | 318/568 |
| 4,467,252 | 8/1984 | Takeda et al. | 318/603 |
| 4,477,874 | 10/1984 | Ikuta et al. | 364/424.05 |
| 4,523,136 | 6/1985 | Dudeck et al. | 318/466 X |
| 4,547,718 | 10/1985 | Ratzel et al. | 318/603 X |
| 4,660,140 | 4/1987 | Illg | 364/424.05 X |
| 4,689,537 | 8/1987 | Mizuta et al. | 318/568 |
| 4,698,571 | 10/1987 | Mizuta et al. | 318/568 |
| 4,706,194 | 11/1987 | Webb et al. | 364/424.05 |
| 4,707,788 | 11/1987 | Tashiro et al. | 364/424.05 |
| 4,728,873 | 3/1988 | Inoue et al. | 318/466 X |
| 4,808,897 | 2/1989 | Saito et al. | 318/568 |

Primary Examiner—William M. Shoop, Jr.
Assistant Examiner—Paul Ip
Attorney, Agent, or Firm—Steele, Gould & Fried

[57] ABSTRACT

A control system for a vehicle power seat, which includes at least an electric actuator for powering at least one seat movement and a controller for operating the same. The system includes an electronic control system for detecting operation of the aforementioned controller and connecting the actuator to an electric power supply over wires which, when the actuator is idle, are cut off from the power supply.

12 Claims, 4 Drawing Sheets

VEHICLE POWER SEAT CONTROL SYSTEM

BACKGROUND OF THE INVENTION

The present invention relates to a system for controlling a vehicle, particulaly an automobile, power seat.

Power seats are known to present electric actuators for adjusting the position of the entire seat (height or longitudinal position in relation to the passenger compartment floor) or part of the seat (e.g. the backrest angle). The said electric actuators usually consist of d.c. motors powered electrically over wires, at least one of which is permanently supplied, and controlled by the driver by means of switches connected directly or indirectly to the supply circuit, for adjusting the seat as required.

The supply wires connecting the electric actuators to the control switches as well as to the vehicle battery cover a fairly long route involving both the seat frame and other parts of the passenger compartment. As at least one of the said wires is permanently supplied, gradual wear due to friction or shearing stress on the wires may result in shorting to ground, possibly also latent shorting, thus constituting a serious fire hazard. The safety fuses provided on the supply circuit for overcoming this problem fail to provide for effective protection against latent shorting. What is more, owing to the optional nature of power seats, no standard provisions are made by vehicle manufacturers for the installation of safety fuses. the location of which poses quite a few problems.

SUMMARY OF THE INVENTION

The aim of the present invention is to provide a control system for a vehicle power seat, designed to overcome the aforementioned drawbacks relating to the actuator supply wires, and so enable total protection with no need for a safety fuse.

Further aims and advantages of the system according to the present invention will be disclosed in the following description.

With this aim in view, according to the present invention, there is provided a control system for a vehicle power seat, said system comprising at least an electric actuator for powering one seat movement, and means for controlling operation of the same; characterized by the fact that it comprises an electronic control system for detecting operation of the said control means and determining a connection for electrically supplying the said actuator over supply wires which, when the said actuator is idle, are cut off from the said power supply.

BRIEF DESCRIPTION OF THE DRAWINGS

One embodiment of the present invention will be described by way of a non-limiting example with reference to the accompanying drawings, in which.

DETAILED DESCRIPTION OF THE INVENTION

Figure 1:
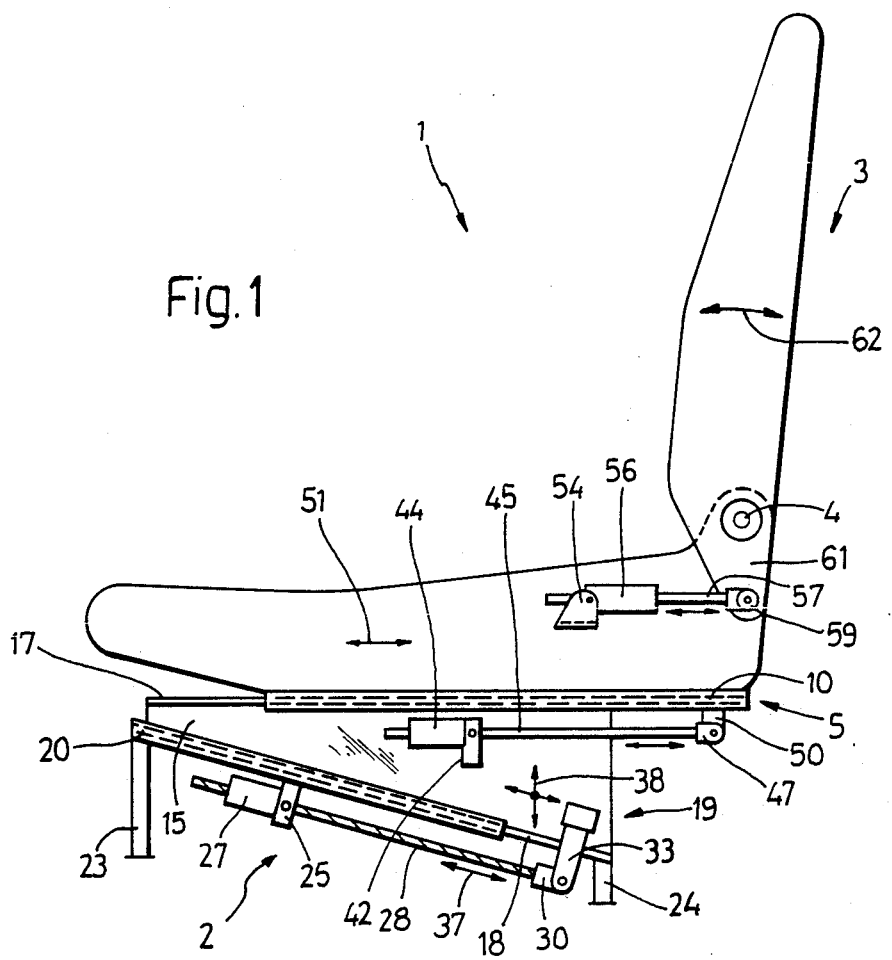
FIG. 1 shows a schematic side view of a vehicle seat to which may be fitted the control system according to the present invention.

No. 1 in FIG. 1 indicates a vehicle seat to which may be fitted the control system according to the present invention. The said seat 1 is, for example, of the type described in Italian Utility Patent Application entitled "Vehicle Power Seat" filed on 29 July 1987 by the present Applicant, and the content of which is included herein for reference purposes as required. In particular, the said seat 1 comprises a seat portion 2, and a backrest 3 connected to a rear portion of seat portion 2 via a horizontal transverse hinge 4. Seat portion 2 presents an undercarriage 5 comprising a substantially horizontal guide 10 of substantially rectangulr section, housing a number of rollers and having, on its bottom face, a longitudinal gap engaged in sliding manner by a flat, substantially vertical plate 15 shaped, in elevation, substantially in the form of a triangle and, in section, substantially in the form of a double "T". The said plate 15 consists of two superimposed triangular metal sheets integral with each other, and the top and bottom edges of which are turned outwards in opposite directions so as to form two flat wings 17 and 18. Top wing 17, arranged substantially horizontally, is housed inside guide 10 and connected in sliding manner to the said internal rollers.

The said plates 15, on either side of seat portion 2, combine to form a slide 19 traveling along two fixed longitudinal roller guides 20. Each of guides 20 presents a substantially rectangular section and, along its upper face, a longitudinal gap engaged in sliding manner by the bottom portion of respective plate 15. Bottom wing 18 of each plate 15 extends parallel with and inside respective guide 20, and rests in sliding manner on the said rollers housed inside the same.

The bottom surface of each guide 20 is fitted with a front and rear bracket 23, 24 for assembling guide 20 to the vehicle floor (not shown), and a fork-shaped intermediate bracket 25 fitted in oscillating manner with an electric linear actuator 27, e.g. of the type described in Utility Patent Application n. 53558-B/87 filed on 24 July 1987 by the present Applicant and the content of which is included herein for reference purposes as required. In particular, the said electric linear actuator may comprise an output member consisting of a screw powered, via a recirculating-ball screwnut screw coupling, by a geared motor connected to an electric d.c. motor.

In this particular case, electric actuator 27 powers a screw 28 extending beneath respective guide 20 towards rear bracket 24, and the free end of which presents a head 30 connected in oscillating manner to the bottom end of a bracket 33, the top of which is welded to the inner surface of respective plate 15.

Operation of both actuators 27 thus provides for moving slide 19 along guides 20 in the direction of arrows 37, by vertically moving guides 10 in the direction of arrows 38.

Each plate 15 is connected to a fork 42 supporting, in oscillating manner, a further electric linear actuator 44 substantially identical to actuator 27 and presenting an output member consisting of a screw 45 extending beneath respective guide 10 towards rear bracket 24 and the free end of which presents a head 47 connected in oscillating manner to the bottom end of bracket 50, the top of which is welded to an inner side wall close to the rear end of guide 10.

Operation of both actuators 44 thus provides for moving carriage 5 along slide 19 in the direction of arrows 51.

The frame of seat portion 2 is fitted inside with a longitudinal tubular body 54 supporting, in oscillating manner, a further electric linear actuator 56 substantially identical to actuator 27 and comprising an output member consisting of a screw 57 extending rearwards of seat 1 and the free end of which presents a head 59 connected to the bottom end of the frame 61 on backrest 3, beneath hinge 4.

Operation of both actuators 56 thus provides for rotating backrest 3 in relation to carriage 5 and about the axis of hinge 4 in the direction of arrows 62.

Figure 2:
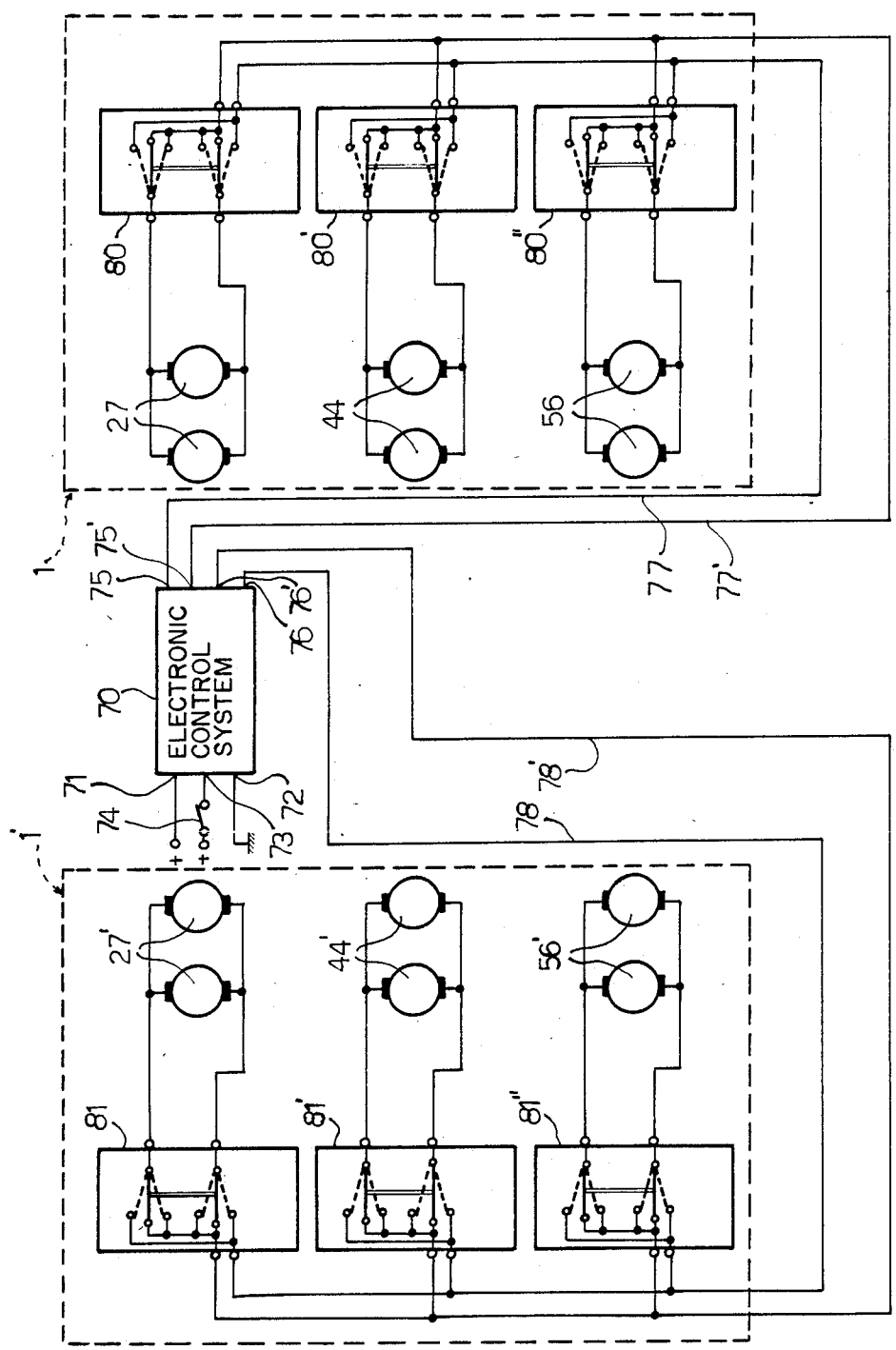
FIG. 2 shows a block diagram of the control system according to the present invention.

Number 70 in FIG. 2 indicates an electronic control system for controlling the system according to the present invention. The said system 70 presents two input terminals 71 and 72 connected respectively to a positive supply voltage and ground; an input terminal 73 connected to a positive supply voltage via switch 74 controlled by the ignition switch on the vehicle; and two pairs of output terminals 75, 75' and 76, 76' connected to respective pairs of wires 77, 77' and 78, 78' supplying respective power seats 1, 1'.

With reference to the FIG. 1 seat, each seat presents three pairs of electric linear actuators 27, 44 and 56; and d.c. motors of each pair having their corresponding armature terminals (i.e. generating the same rotation) connected together and to respective common terminals of a dual switch 80, 80', 80''.

Each of the said dual switches 80, 80', 80'' is located for easy access by the driver, e.g. to the side of the seat, and provides, when operated one way or the other, for selecting and controlling movement of the seat by respective actuators 27, 44 and 56, as described with reference to FIG. 1. The neutral center terminals of each dual switch 80, 80', 80'' are connected together and to first opposite switch terminals, in turn connected to supply wire 77'; the other opposite switch terminals all being connected to supply wire 77.

Figure 3:
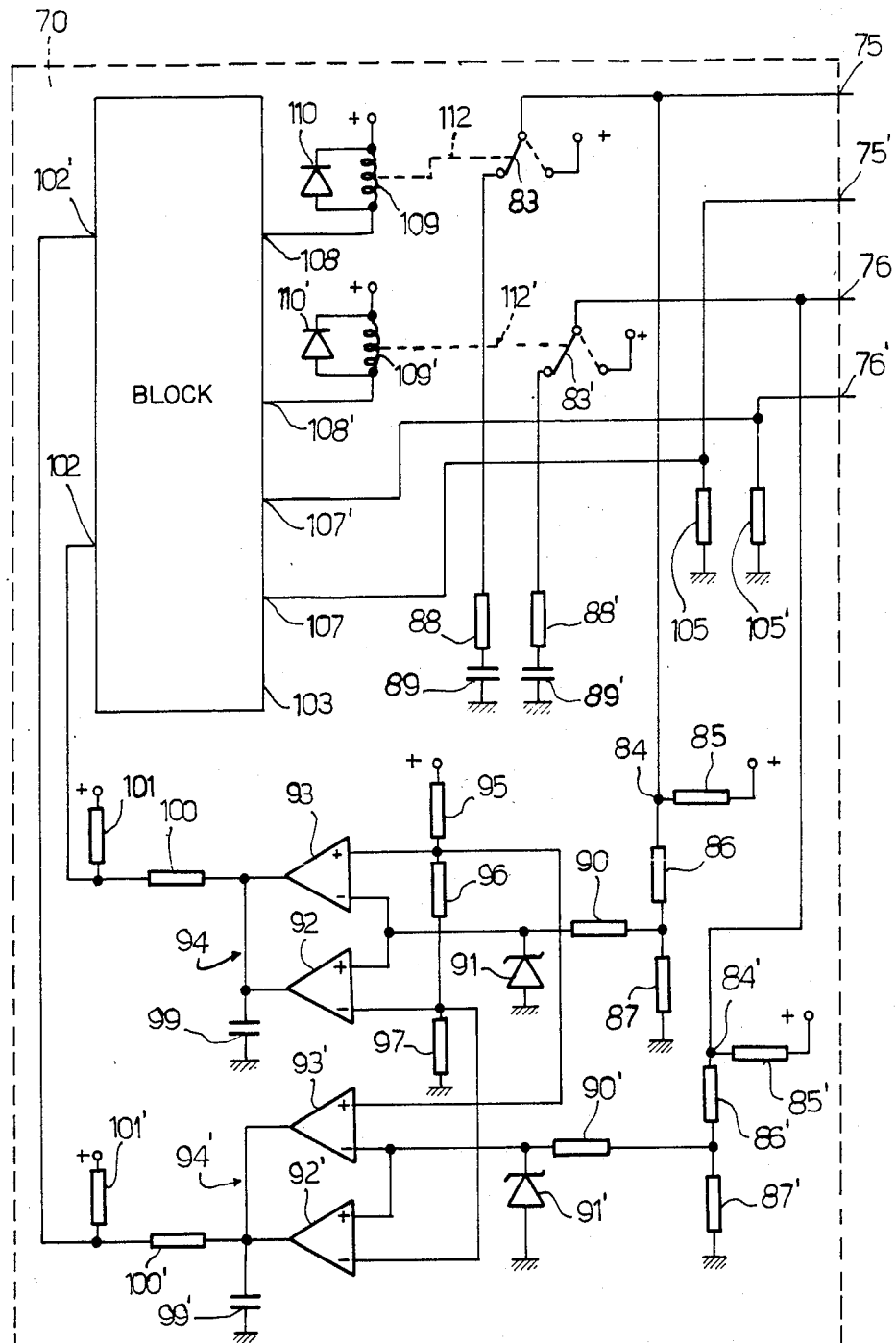
FIG. 3 shows a simplified wiring diagram of the electronic control system on the FIG. 2 system.

The same layout also applies to seat 1', conveniently the front passenger seat, which presents respective electric actuators 27', 44' and 56' with respective dual switches 81, 81', 81'' connected to supply wires 78 and 78'. As shown in the detailed diagram of system 70 in FIG. 3, terminal 75 is connected to both the common terminal of switch 83 and to node 84 of a resistive divider connected between a positive supply terminal and ground, and consisting of three series-connected resistors 85, 86 and 87. Resistor 85 is connected between the supply terminal and node 84, whereas resistors 86 and 87 are connected between node 84 and ground. The total value of resistors 86 and 87 (a few kilograms) is almost equal to the value of resistor 85. Switch 83 presents a first switch terminal connected to a positive voltage supply terminal, and a second switch terminal grounded via the series connection of a relatively low power resistor 88 (a few ohms) and a condenser 89.

Via series resistor 90, the node between resistors 86 and 87 is connected to the cathode of a Zener diode 91, the anode of which is grounded, and to the respective positive and negative inputs of two open-collector type differential amplifiers 92 and 93 which act as threshold comparators and combine to form a range comparator 94. There is also formed a resistive divider consisting of three series-connected resistors 95, 96 and 97 connected between a positive supply terminal and ground, and wherein the node between resistors 95 and 96 is connected to the non-inverting input of comparator 93, and the node between resistors 96 and 97 to the inverting input of comparator 92.

The outputs of comparators 92 and 93 are grounded via condenser 99, and connected to one terminal of resistor 100, the other terminal of which is connected to one terminal of resistor 101 (the other terminal of which is connected to a positive supply terminal) and to input terminal 102 of a block 103 described in more detail later on with reference to FIG. 4.

Terminal 75' of system 70 is grounded via a calibrated resistor 105 of a few milliohms, and connected directly to terminal 107 of block 103.

From block 103 there originates a terminal 108 connected to a positive supply terminal via coil 109 connected parallel with a diode 110 the anode of which is connected to terminal 108. Coil 109 and switch 103 controlled by it constitute a relay 112.

The system 70 components connected to terminals 76 and 76' are the same as those connected to terminals 75 and 75', and are therefore indicated using the same numbering system plus a (').

Figure 4:
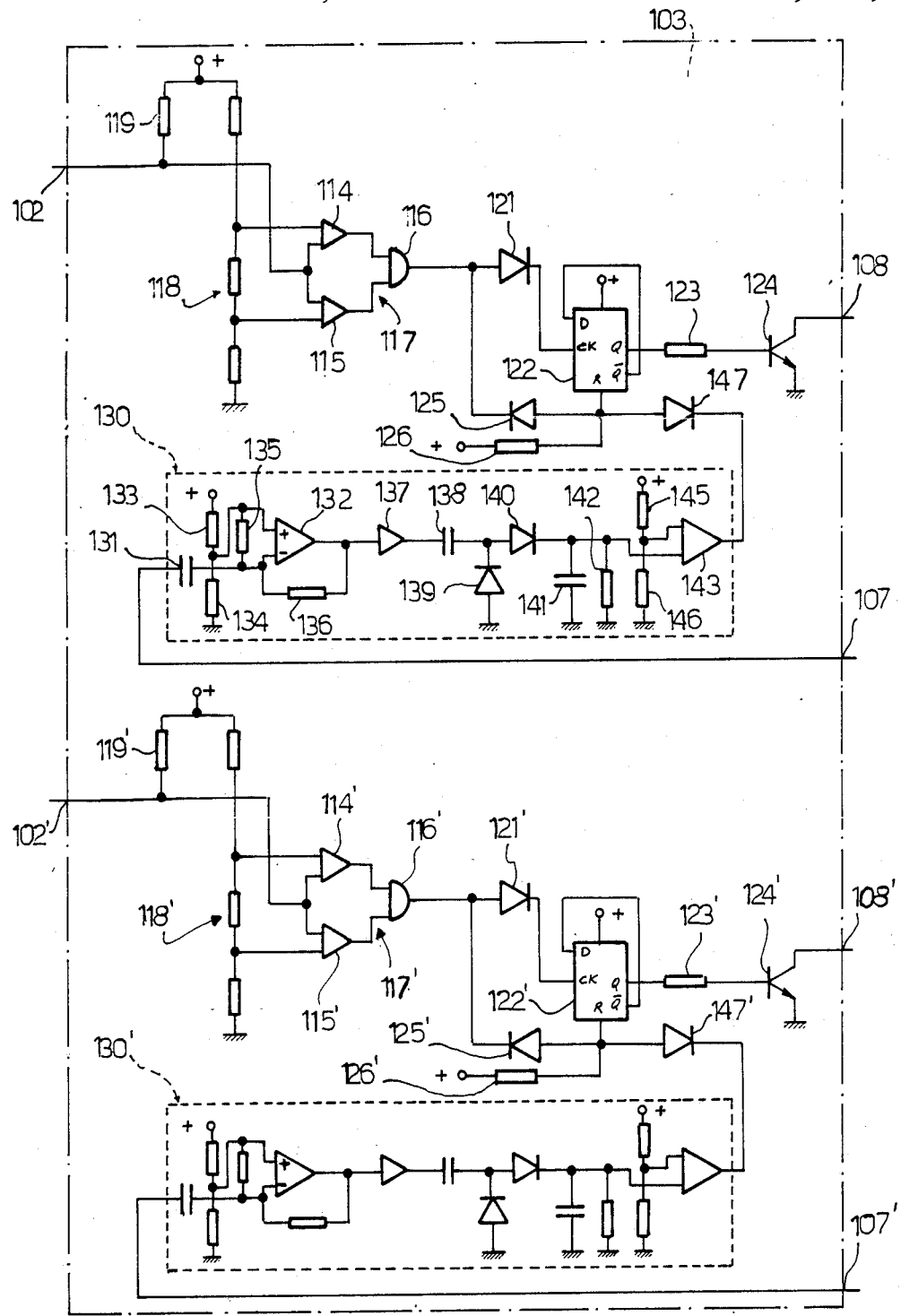
FIG. 4 shows a simplified wiring diagram of a block in the FIG. 3 diagram.

With reference to FIG. 4, in block 103, terminal 102 is connected to the complementary negative and positive inputs of a pair of threshold comparators 114 and 115 constituting a range comparator block 117 and the outputs of which are connected to the inputs of an AND circuit 116. The reference signals for the other inputs of the said comparators 114 and 115 are supplied sucessively by a resistive divider 118 connected between a positive supply terminal and ground. A further resistor 119 is connected between the positive supply terminal and terminal 102. The output of AND circuit 116 is connected to the anode of diode 121, the cathode of which is connected to the clock (CK) input of a D type flip-flop 122 having its negated output Q connected to input D, and its output D connected via resistor 123 to the base of NPN transistor 124, the emitter of which is grounded and the collector of which is connected to terminal 108. The output of AND circuit 116 is also connected to the cathode 125, the anode of which is connected to reset input R of flip-flop 122. The said input R is also connected to the positive supply terminal via resistor 126.

Terminal 107 is in turn connected to the input of a known block 130 (enclosed by the dotted line) designed to detect stoppage of the electric motor whose armature current flows through resistor 105, in the example shown, the electric motors of actuators 27, 44 and 56. The said block 130 is formed as described in Italian Patent Application n. 83618-A/84 filed on 16 April 1984, and mainly comprises an amplifier block, crest detecting block, and threshold comparator block. In particular, terminal 107 is connected, via a continuous component eliminating condenser 131, to the negative input of a differential amplifier 132, the positive input of which is connected to the intermediate connection between two resistors 133 and 134 connected between a positive supply terminal and ground. A resistor 135 is connected between the said positive and negative inputs of amplifier 132, and a resistor 136 between the output of differential amplifier 132 and the negative input, for negative feedback. Via amplifier 137 and condenser 138, the output of amplifier 132 is connected to the cathode of diode 139, the anode of which is grounded, and to the anode of diode 140, the cathode of which is grounded, via the parallel connection of condenser 141 and resistor 142, and connected to an input of threshold comparator 143, the other input of which is connected to the intermediate connection between two resistors 145 and 146 series-connected between a positive supply terminal and ground. The output of comparator 143, which constitutes the output of detecting block 130, is connected to the cathode of diode 147, the anode of which is connected to the reset input R of flip-flop 122.

The same applies to the connection of terminals 102', 107' and 108', the corresponding circuit components of which are indicated using the same numbering system plus a (').

For the sake of simplicity, component supply and biasing have been omitted in both the system 70 and component block diagrams.

The control system according to the present invention operates as follows.

With reference to FIG. 2 and seat 1, if none of dual switches 80, 80', 80" is operated by the user, the switch settings are as shown by the continuous line, i.e. shorting between the motor terminals of respective actuators 27, 44 and 56, which therefore remain idle. In this condition, no connection is established between supply wires 77 and 77', so that, towards system 70, wire 77 is grounded via the series connection of resistor 88 and condenser 89, and wire 77' is grounded via resistor 105. When the said actuators are idle, the said wires 77 and 77' are therefore cut off from te power supply. For adjusting the seat via one of actuators 27, 44 or 56, the user sets respective dual switch 80, 80' or 80" as required, thus establishing connection of the actuator motor (relatively low resistance) between wires 77 and 77', and bringing terminal 75 and node 84 on system 70 close to ground potential. Via amplifier 92, this produces a low level output signal from group 94, and a given voltage signal at terminal 102, which is picked up by range comparator 117 and activates flip-flop 122 and, via transistor 124, also relay 112. This therefore sets switch 83 as shown by the dotted line, thus supplying wire 77 with positive voltage. The motor of the actuator selected via dual switch 80, 80' or 80" is thus supplied with the current grounded via the other wire 77'. When switch 83 is set as shown by the dotted line, node 84 is set to substantially maximum voltage, thus producing, via amplifier 93, a low level output signal from group 94 and no change in the terminal 102 signal. Flip-flop 122 and relay 112 therefore remain activated, thus supplying wire 77 with positive voltage for powering the relative actuator.

For arresting the actuator, the user releases the previously selected dual switch 80, 80' or 80", thus disconnecting wires 77 and 77'. Node 84 switches to a mid voltage value, e.g. 6 V, thus causing the output signal from group 94 to depart from the value detected by group 117. In the absence of a logic 1 signal from AND circuit 116, flip-flop 122 is reset via resistor 126 and diode 125, thus deactivating relay 112 via transistor 124 and setting switch 83 as shown by the continuous line, so as to cut wire 77 off from the power supply. Disconnection of wires 77 and 77' stops the actuator motor, which, in the absence of armature current oscillation, is detected via sensor 105 by block 130, which emits a safety signal for resetting flip-flop 122.

The actuator may only be operated further by again setting one of dual switches 80, 80' or 80" as already described.

In the event of the actuator reaching the limit stop position without the dual switch having been released, the actuator is arrested mechanically. In the absence of armature current oscillation, arrest of the actuator is again detected by block 130 which again resets flip-flop 122 and deactivates relay 112 as already described. Relay 112 is also deactivated in the event of any one of dual switches 80, 80', 80" jamming in the operative position.

The same operating procedure also applies to seat 1', via supply wires 78 and 78' and the respective circuit portions of system 70.

The advantages of the system according to the present invention will be clear from the foregoing description. In particular, by virtue of the power supply wires being cut off from the positive supply when the actuators are idle, any danger of shorting, latent or otherwise, is eliminated, thus also enabling the safety fuse to be dispensed with. Furthermore, any hazards deriving from jamming of the control switches are safeguarded against by the said detecting block for detecting the absence of armature current oscillation.

To those skilled in the art it will be clear that changes may be made to the embodiment described and illustrated herein without, however, departing from the scope of the present invention.

For example, changes may be made to the number of actuators for each movement, to the type of movement, and to the circuit configurations illustrated by way of example.

I claim:

1. A control system for a vehicle power seat (1), said system comprising at least an electric actuator (27, 44, 56) for powering one seat movement, and control means (80, 80', 80") for controlling operation of the same; an electronic control system (70) for detecting operation of said control means (80, 80', 80") and for electrically connecting a power supply to said actuator (27, 44, 56) over supply wires (77, 77') which, when said actuator (27, 44, 56) is idle, cuts off from the said power supply;
    said electronic control system (70) includes a first means (94) for detecting operation of said control means (80, 80', 80") via a variation in an electric input signa; said first means (94) determining, via a second means (103, 112), a status of the means (83) for electrically connecting the power supply to said actuator (27, 44, 56) over said supply wires (77, 77'); and
    said second means including a relay (112) for establishing the status of the means for electrically connecting said power supply to said actuator (27, 44, 56) over said supply wires (77, 77').

2. A system as claimed in claim 1 wherein said first means includes a range comparator means (94) for detecting said variation in the electric input signal within at least a predetermined range, and consequently supplying a control signal for said second means (103, 112).

3. A system as claimed in claim 1, wherein said control means includes a switch means (80, 80', 80") for selecting operation of said electric actuator (27, 44, 56).

4. A system as claimed in claim 3, wherein said switch means (80, 80', 80") is connected directly to a circuit electrically supplying said actuator (27, 44, 56) over said supply wires (77, 77').

5. A system as claimed in claim 3, wherein when idle, said switch means (80, 80', 80") provides means for short-circuiting between terminals of said actuator (27, 44, 56) and consequently disconnects said supply wires (77, 77').

6. A system as claimed in claim 1, including a number of the actuators (27, 44, 56) for said seat (1); the actuators (27, 44, 56) being supplied by one pair of supply wires (77, 77').

7. A system as claimed in claim 6, wherein at least one actuator (27) of said number is included for regulating the height of said seat; a second actuator (44) of said number is included for regulating the longitudinal position of said seat; and a third actuator (56) of said number is included for adjusting the angle of the backrest (3) of said seat.

8. A control system for a vehicle power seat (1), said system comprising at least an electric actuator (27, 44, 56) for powering one seat movement, and control means (80, 80', 80'') for controlling operation of the same; an electronic control system (70) for detecting operation of said control means (80, 80', 80'') and for electrically connecting a power supply to said actuator (27, 44, 56) over supply wires (77, 77') which, when said actuator (27, 44, 56) is idle, cuts off from the said power supply;
said electronic control system (70) includes a first means (94) for detecting operation of said control means (80, 80', 80'') via a variation in an electric input signal; said first means (94) determining, via a second means (103, 112), a status of the means (83) for electrically connecting the power supply to said actuator (27, 44, 56) over said supply wires (77, 77');
said second means (103, 112) including means for varying within a predetermined range said electric input signal to said first means (94) upon release of said control means (80, 80', 80'').

9. A control system for a vehicle power seat (1), said system comprising at least an electric actuator (27, 44, 56) for powering one seat movement, and control means (80, 80', 80'') for controlling operation of the same; an electronic control system (70) for detecting operation of said control means (80, 80', 80'') and for electrically connecting a power supply to said actuator (27, 44, 56) over supply wires (77, 77') which, when said actuator (27, 44, 56) is idle, cuts off from the said power supply;
said electronic control system (70) includes a first means (94) for detecting operation of said control means (80, 80', 80'') via a variation in an electric input signal; said first means (94) determining, via a second means (103, 112), a status of the means (83) for electrically connecting the power supply to said actuator (27, 44, 56) over said supply wires (77, 77');
said second means (103) including a memory circuit means (122) for detecting a control signal from said first means (94) and consequently maintaining power supply to said actuator (27, 44, 56) over said supply wires (77, 77').

10. A system as claimed in claim 9, wherein said memory circuit means (122) is reset by at least a means (130) for detecting arrest of said actuator (27, 44, 56) that includes an electric motor.

11. A system as claimed in claim 10, wherein said means for detecting includes a circuit means connected parallel with a supply circuit of the motor for detecting the absence of armature current oscillation.

12. A control system for a vehicle power seat (1), said system comprising at least an electric actuator (27, 44, 56) for powering one seat movement, and control means (80, 80', 80'') for controlling operation of the same; an electronic control system (70) for detecting operation of said control means (80, 80', 80'') and for electrically connecting a power supply to said actuator (27, 44, 56) over supply wires (77, 77') which, when said actuator (27, 44, 56) is idle, cuts off from the said power supply;
said electronic control system (70) includes a first means (94) for detecting operation of said control means (80, 80', 80'') via a variation in an electric input signal; said first means (94) determining, via a second means (103, 112), a status of the means (83) for electrically connecting the power supply to said actuator (27, 44, 56) over said supply wires (77, 77');
said second means (103) includes a range comparator means (117) for detecting an electrical control input signal from said first means (94).

* * * * *